United States Patent
Wrase

(10) Patent No.: US 12,504,760 B2
(45) Date of Patent: Dec. 23, 2025

(54) WORK RANGE CALCULATOR FOR ELECTRIC LAWN MOWER

(71) Applicant: Honda Motor Co., Ltd., Tokyo (JP)

(72) Inventor: Eric Wrase, Offenbach/Main (DE)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 17/956,842

(22) Filed: Sep. 30, 2022

(65) Prior Publication Data
US 2024/0111294 A1  Apr. 4, 2024

(51) Int. Cl.
*G05D 1/00* (2024.01)
*A01D 34/00* (2006.01)
*A01D 34/78* (2006.01)
*A01D 101/00* (2006.01)

(52) U.S. Cl.
CPC ......... *G05D 1/0217* (2013.01); *A01D 34/008* (2013.01); *A01D 34/78* (2013.01); *G05D 1/0219* (2013.01); *A01D 2101/00* (2013.01)

(58) Field of Classification Search
CPC .................... G05D 1/0217; G05D 1/0219
See application file for complete search history.

(56) References Cited

U.S. PATENT DOCUMENTS

2021/0116911 A1* 4/2021 Pjevach ............... B60L 50/66
2021/0278841 A1* 9/2021 McGee ........... B60W 30/18009

FOREIGN PATENT DOCUMENTS

CN  114912893 A  *  8/2022

* cited by examiner

*Primary Examiner* — Wade Miles
*Assistant Examiner* — Jerrod Irvin Davis
(74) *Attorney, Agent, or Firm* — JCIPRNET

(57) ABSTRACT

A non-transitory computer readable medium, storing a program causing a computer to execute a process including a step of obtaining, by an input unit, a work area information of an electric lawn mower; a step of calculating, by a processor, a required electricity amount of the electric lawn mower based on the work area information; and a step of outputting, by an output unit, the required electricity amount of the electric lawn mower.

9 Claims, 6 Drawing Sheets

| Step 1 | Shape | Type 3 |
|---|---|---|
| Please assess the condition of your garden at home. How complex is it, what type of lawn, are there bows or flowerbeds included? This will give you a load index and shape index. | Kind of Grass | Meadow |
| | Auto watering | No |
| | Frequency of cutting | Every week |
| | Cut amount [cm] | 1,5 |
| | Mowing mode | Collect |
| | Slopes | No |
| Shape & load factor: 0, 40  1,33,  0,34 | | |

FIG. 4

| Step 2<br><br>If you have already mowed your lawn with another machine, please evaluate your actual lawn size, the time it took you to mow the entire area, the time not to mow, and the cutting width of the old machine.<br><br>Overlap mowing: 10% perfect 15% normal 20% much; >20% very much<br><br>NOTE: If answer NO calculator use Step 1 speed | Total mowing time | min | 38 |
|---|---|---|---|
| | Non-mowing time | % | 28% |
| | Overlap mowing | | 30% |
| | Mowing width | m | 0,41 |
| | Area to mow | m | 160 |
| | Customer don't know above | Yes | |
| Mowing speed calculator: | 0.34 m/s | | |

FIG. 5

WORK RANGE CALCULATOR FOR ELECTRIC LAWN MOWER

BACKGROUND OF THE DISCLOSURE

Technical Field

The disclosure relates to a work range calculator for a lawn mower, and more specifically relates to the work range calculator for an electric lawn mower.

Related Art

Conventionally, in the electric lawn mower, a battery size is important. For example, when the battery is relatively small compared to a work area of the electric lawn mower, then a grass cutting cannot be completed by one charge of the battery which may be inconvenient.

On the other hand, the battery having a large capacity is heavy, and has a high cost which poses an unnecessary cost burden for a light user.

Therefore, a way for selecting the battery according to user requirements is needed.

SUMMARY

According to an embodiment of the disclosure, a non-transitory computer readable medium, storing a program causing a computer to execute a process including a step of obtaining, by an input unit, a work area information of an electric lawn mower; a step of calculating, by a processor, a required electricity amount of the electric lawn mower based on the work area information; and a step of outputting, by an output unit, the required electricity amount of the electric lawn mower.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

FIG. 4 illustrates an example of shape information and load factor information which may be inputted using an input unit according to an embodiment of the disclosure.

FIG. 5 illustrates examples of assigning lawn shape information and grass information according to an embodiment of the disclosure.

DESCRIPTION OF THE EMBODIMENTS

Figure 1:
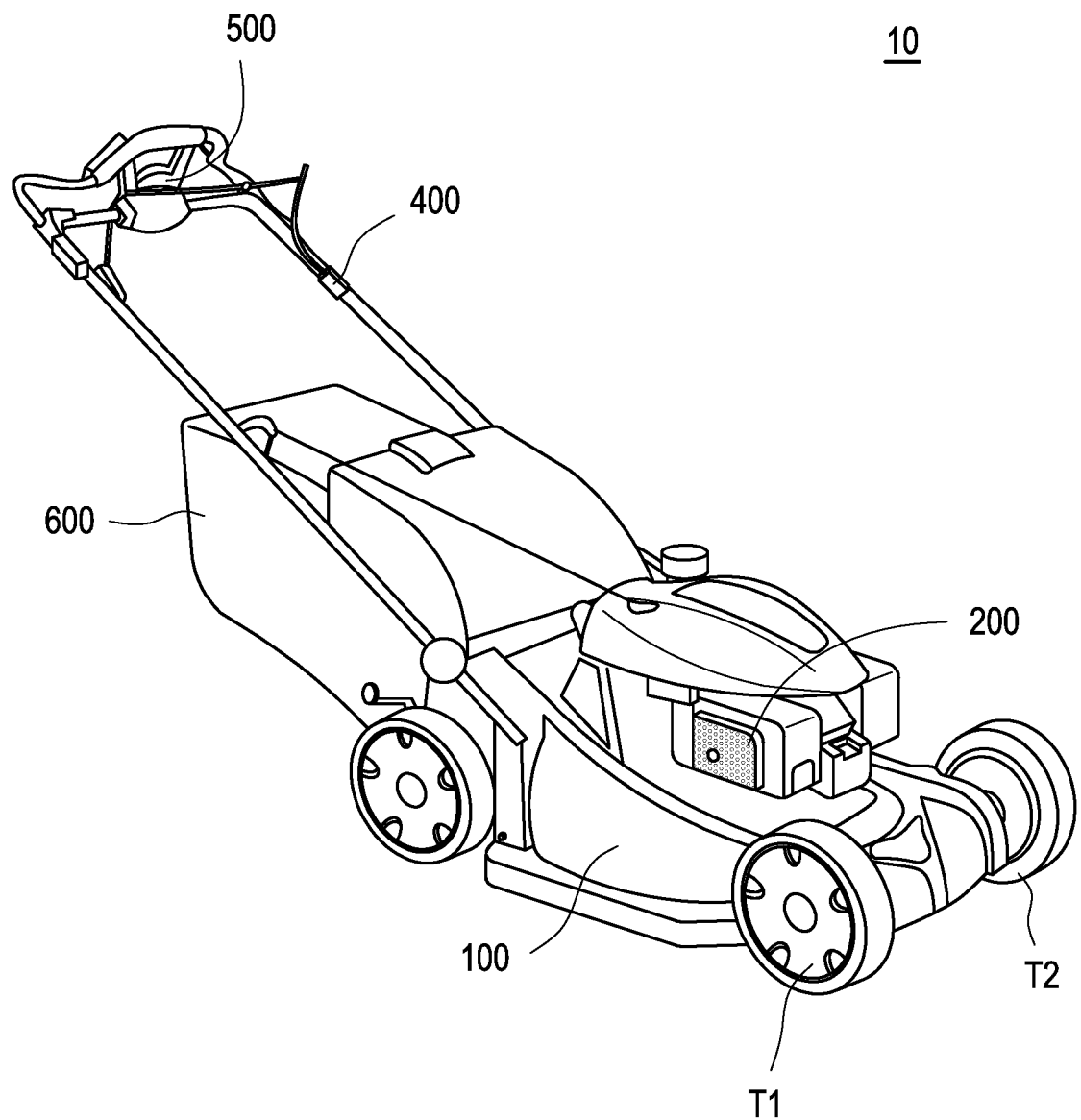
FIG. 1 is a perspective view diagram illustrating an electric lawn mower according to an embodiment of the disclosure.

FIG. 1 is a perspective view diagram illustrating an electric lawn mower according to an embodiment of the disclosure. Referring to FIG. 1, a lawn mower 10 is provided. The lawn mower 10 includes a frame 100, an electric motor 200 and a handle 400. The electric motor 200 is disposed on the frame 100. The handle 400 is attached on the frame 100. A grass bag 600 is disposed on the frame 100.

The lawn mower 10 include a plurality of tires T1, T2 disposed on the frame 100. A number of the tires is not intended to limit the disclosure. The handle 400 includes a control panel 500 having a switch, and is adapted for a user to operate (turn ON or OFF) the lawn mower 10. The switch may be a mechanical switch or an electrical switch, and the type of switch is not intended to limit the disclosure. The control panel 500 may further include other controls for various settings of the lawn mower 10 such as, for example, mulching, bagging, side discharge, blade length, mowing speed and the like.

Figure 2:
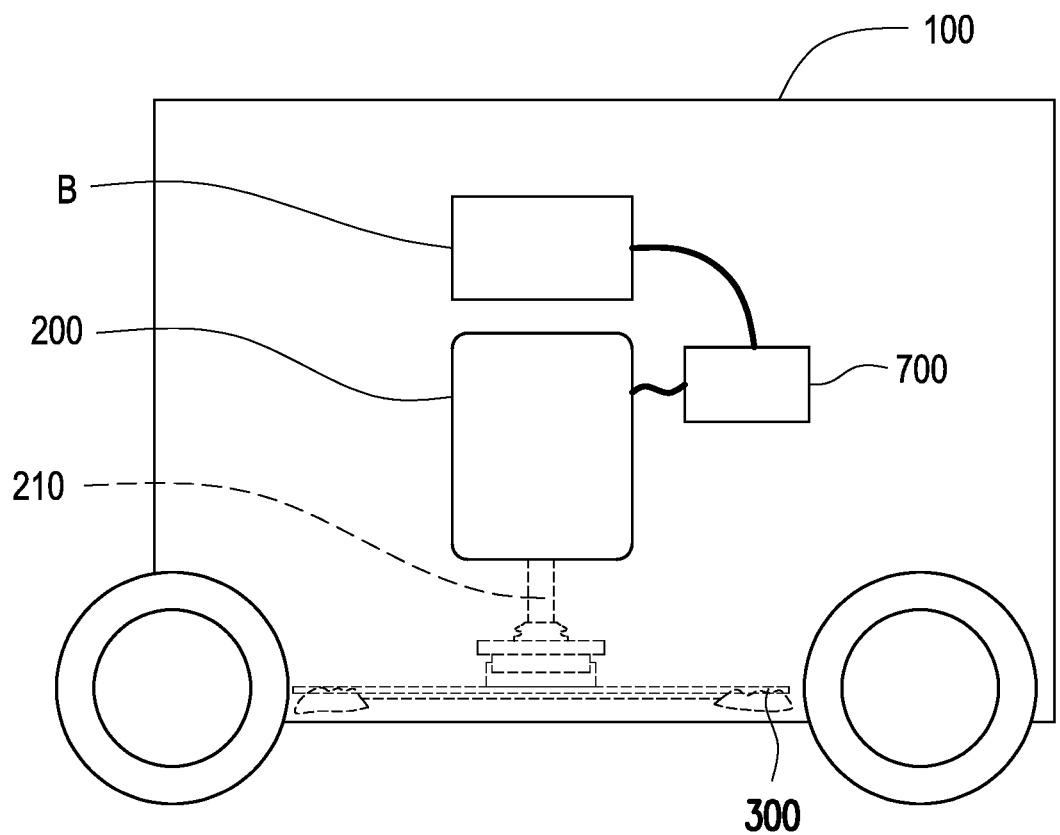
FIG. 2 is a schematic diagram illustrating working part of an electric lawn mower according to an embodiment of the disclosure.

FIG. 2 is a schematic diagram illustrating working part of an electric lawn mower according to an embodiment of the disclosure. The electric motor 200 includes a shaft 210. The shaft 210 protrudes from the electric motor 200. The shaft 210 is coupled to the electric motor 200 such that the shaft 210 is rotated by the electric motor 200. A cutter blade 300 is fixed to an end of the shaft 210 opposite to the electric motor 200. The cutter blade 300 is an example of a working part. The cutter blade 300 is disposed rotatably inside the frame 100. The cutter blade 300 is adapted to cut grass. The lawn mower 10 may be referred to as an electric lawn mower since the cutter blade 300 is rotated to cut the grass using the electric motor 200.

The lawn mower 10 includes a battery B. The battery B is disposed on the frame 100. The battery B is electrically coupled to the electric motor 200 via an electronic controller unit (ECU) 700. The ECU 700 may be, for example, an electric motor driver which controls, for example, the voltage, current, phase and/or the like that is transmitted to the electric motor 200. The electric motor 200 may include a sensor such as an encoder and/or a tachometer (not shown) to provide feedback to the ECU 700 to perform feedback control. In addition, a controller (not shown), that includes a processor, is electrically connected to the ECU 700. In an embodiment of the disclosure, the control panel 500 may be connected to the controller. The controller sends commands to the ECU 700, wherein the ECU 700 controls the electrical discharge from the battery B to the electric motor 200.

Figure 3:
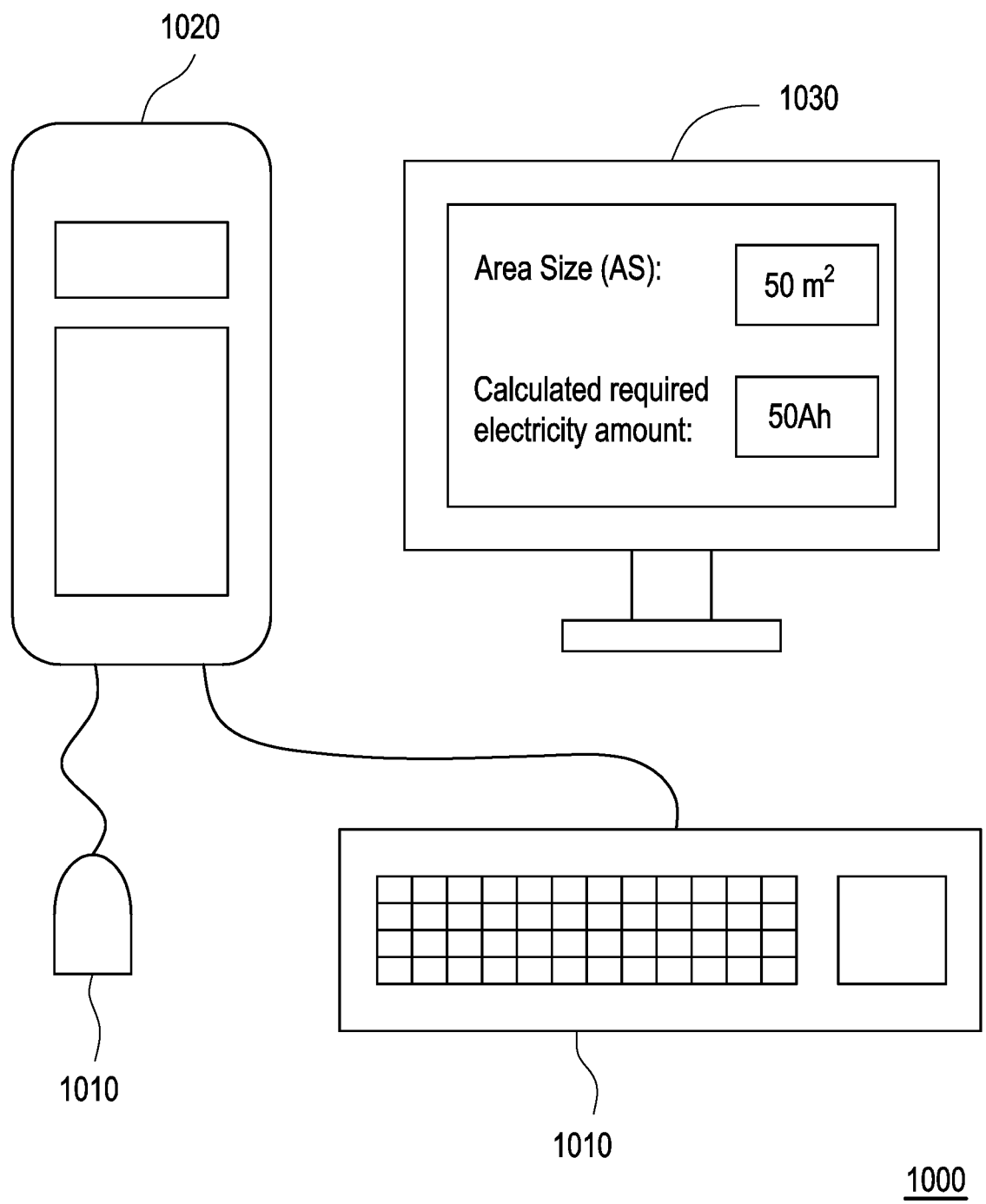
FIG. 3 is a schematic diagram illustrating a system for calculating a required electricity amount of an electric lawn mower according to an embodiment of the disclosure.

FIG. 3 is a schematic diagram illustrating a system for calculating a required electricity amount of an electric lawn mower according to an embodiment of the disclosure. Referring to FIG. 3, a system 1000 for calculating the required electricity amount of the lawn mower 10 is provided. The system 1000 includes an input unit 1010, a computer 1020 and an output unit 1030.

In the present embodiment, the input unit 1010 is a keyboard. In another embodiment of the disclosure, the input unit 1010 may be, for example, a computer mouse or a touch screen display that is configured to obtain an input from a user of the system 1000. In another embodiment of the disclosure, the input unit 1010 may be, for example, a combination of input units such as a combination of the keyboard, the computer mouse and/or the touch screen display. In another example embodiment, the input unit 1010 may include a microphone for obtaining speech input from the user, wherein the speech input is converted to text by the computer 1020. The above descriptions of the input unit 1010 are described as examples only and are not intended to limit the disclosure.

The computer 1020 includes a processor and a memory. In the present embodiment, the output unit 1030 is a display having a display screen. However, the disclosure is not limited thereto. In another embodiment of the disclosure, the output unit 1030 may be, for example, a speaker which outputs sound or noise. In another embodiment of the disclosure, the output unit 1030 may be, for example, an operation screen or a display (user interface and/or the like) which is disposed on the lawn mower 10. More specifically, the output unit 1030 may be disposed on the lawn mower body. The above descriptions of the output unit 1030 are described as examples only and are not intended to limit the disclosure.

The input unit 1010 and the output unit 1030 are coupled to the computer 1020. More specifically, the input unit 1010 is electrically coupled to the computer 1020 via a wire and/or a cable, and the output unit 1030 is electrically coupled to the computer 1020 via a wire and/or a cable.

Referring to FIG. 3, a user of the system 1000 may perform a step of inputting a work area information WAI of the electric lawn mower 10 using the input unit 1010 such as the keyboard. The work area information WAI inputted using the input unit 1010 is transmitted to the computer 1020 and displayed on the output unit 1030. In another embodiment of the disclosure, the work area information WAI may be configured to be inputted/obtained automatically and transmitted to the computer 1020 without user interaction.

The work area information WAI incudes, information regarding an area size AS of the work area WA of the lawn mower 10. Referring to FIG. 3, the area size AS of 50 square meters is inputted using the input unit 1010. The area size AS of the work area WA may be expressed, for example, in square meters, square feet, acres and/or the like. The above units of the area size AS are described as examples only and are not intended to limit the disclosure.

In an embodiment of the disclosure, the area size AS may be obtained by, for example, by direct input using the keyboard, mouse, microphone and/or the like. In another embodiment of the disclosure, the area size AS may be estimated by using information of an aerial photograph. That is to say, the area size AS may be estimated or obtained from the aerial photograph. The aerial photograph may be an aerial photograph, for example, from Google maps.

In another embodiment of the disclosure, the area size AS may be estimated by using existing GPS information of a lawn mower. For example, when the lawn mower 10 is an automatic lawn mower having a Global navigation satellite system (GNSS) such as a GPS, the GPS coordinates obtained from the lawn mower may be used to estimate the area size AS of the work area WA. In addition, the area size may be obtained from information from the rotation of the tires by using a gyro sensor of the lawn mower or the like to run along one circumference of the work area.

After the work area information WAI is inputted using the input unit 1010, the computer 1020 performs a step of calculating a required electricity amount of the electric lawn mower 10 based on the work area information WAI. The calculation of the required electricity amount of the electric lawn mower 10 is an estimation of the required electricity amount for mowing the area size AS based on a model equation. The model equation takes into consideration factors such as the area size AS and electricity required for the lawn mower 10 to mow a unit area of the area size AS. An example model equation may be expressed as below.

required electricity amount=[area size AS]×[electricity required to mow a unit area]    (Model Equation)

Referring to FIG. 3, if the lawn mower 10 requires, for example, 1.0 ampere hours (Ah) of electricity to mow an area of 1 square meters, then the lawn mower 10 may be calculated using the example model equation as requiring 50 ampere hours of electricity to mow the work area WA having an area size AS of 50 square meters. That is to say, the required electricity amount is 50 ampere hours.

Similarly, the lawn mower 10 requiring 1.0 ampere hours of electricity to mow an area of 1 square meters, may calculated as requiring 30 ampere hours of electricity to mow the work area WA having an area size AS of 30 square meters. That is to say, the required electricity amount is 30 ampere hours.

If the lawn mower 10 requires, for example, 0.5 ampere hours (Ah) of electricity to mow an area of 1 square meters, then the lawn mower 10 may be calculated using the example model equation as requiring 25 ampere hours of electricity to mow the work area WA having an area size AS of 50 square meters. That is to say, the required electricity amount is 25 ampere hours. Similarly, the lawn mower 10 requiring 0.5 ampere hours of electricity to mow an area of 1 square meters, may calculated as requiring 15 ampere hours of electricity to mow the work area WA having an area size AS of 30 square meters. That is to say, the required electricity amount is 15 ampere hours.

If the lawn mower 10 requires, for example, 0.1 ampere hours (Ah) of electricity to mow an area of 1 square meters, then the lawn mower 10 may be calculated using the example model equation as requiring 5 ampere hours of electricity to mow the work area WA having an area size AS of 50 square meters. That is to say, the required electricity amount is 5 ampere hours. Similarly, the lawn mower 10 requiring 0.1 ampere hours of electricity to mow an area of 1 square meters, may calculated as requiring 3 ampere hours of electricity to mow the work area WA having an area size AS of 30 square meters. That is to say, the required electricity amount is 3 ampere hours.

After the required electricity amount of the electric lawn mower 10 is calculated, the computer 1020 performs a step of outputting the required electricity amount to the output unit 1030. In the present embodiment, the required electricity amount is expressed in ampere hours (Ah). In another embodiment of the disclosure, the required electricity amount may be expressed in, for example, watt hours (Wh). The above units of the required electricity amount are described as examples only and are not intended to limit the disclosure.

In addition to outputting the required electricity amount of the lawn mower 10 to the output unit 1030, the computer 1020 may further perform a step of outputting information regarding a recommended battery to the output unit 1030 based on the required electricity amount. In an embodiment of the disclosure, the information regarding the recommended battery may include, for example, a battery capacity of a recommended battery such as "30 Wh or more", "XX Ah or more, YY Ah or less" and/or the like, wherein XX and YY are numbers representing a battery capacity.

In another embodiment of the disclosure, battery information (part number and/or battery specification) of batteries owned by a user or batteries stored in inventory of a shop may be pre-stored (input) to the computer 1020, wherein the battery information of an optimal battery may be displayed on the output unit 1030 based on the required electricity amount. For example, if the shop has 5, 10, 15, 20, 30, 40, 50 Wh batteries in inventory, and the calculation result requires the required electricity amount of 29 Wh, then the battery information of the 30 Wh, 40 Wh, 50 Wh batteries may be output to the output unit 1030. The output unit 1030 may apply a priority when outputting the battery information of the 30 Wh, 40 Wh, 50 Wh batteries, such that the battery closest to the required electricity amount is displayed on top and the battery furthest to the required electricity amount is displayed at the bottom. The priority may be, for example, 30 Wh>40 Wh>50 Wh.

After the required electricity amount of the electric lawn mower 10 is calculated, a user may perform a step of selecting the battery based on the required electricity amount that is calculated. For example, when the estimated required electricity amount is 30 ampere hours, a battery having a rating of 30 ampere hours may be selected to be mounted to the lawn mower 10. In another embodiment, when the estimated required electricity amount is 30 ampere hours, a battery having a rating of 35 ampere hours may be selected to be mounted to the lawn mower 10. Accordingly, the user may select the battery that is sufficient to satisfy the estimated required electricity amount. In this way, by calculating a capacity of the battery that suits the users usage requirements, it may be possible to prevent the battery from depleting before the mowing work is completed.

In another embodiment, when the estimated required electricity amount is 30 ampere hours, and the only batteries having a specification closest to the calculated 30 ampere hours are a battery having a rating of 28 amperes hours and a battery having a rating of 45 ampere hours, then the battery having the rating of 28 ampere hours may be selected to be mounted to the lawn mower 10. In this way, it may be possible to prevent an excessive cost burden to the user. In another embodiment of the disclosure, the battery having the rating of 45 ampere hours may be selected to be mounted to the lawn mower 10.

After the battery is selected, the selected battery may be mounted to the lawn mower 10, and a user may perform a step of conducting grass cutting by the electric lawn mower using the selected battery.

In the above described embodiments of the disclosure, the work area information WAI including the area size AS of the work area WA was described. However, the disclosure is not limited thereto. In another embodiment of the disclosure, the work area information WAI may further include lawn shape information.

The lawn shape information may include information, for example, which describes a complexity of the lawn shape. For example, the lawn shape may be rated as having a complexity type, from 1-4. Type 1 may represent an extremely very simple shape such as a square, rectangle, circle and the like. Type 2 may represent a very simple shape such as an L-shaped lawn. Type 3 may represent a moderate shape with radius/bows, some obstacle, but with long distance to travel from end to end. Type 4 may be a complex shape with radius/bows, slopes, trees, nishes.

The lawn shape may also be rated based on a presence of inclined surfaces and/or slopes (battery load may increase on inclined surfaces), a distance from the lawn to the warehouse for lawnmower storage (if the tires of the lawn mower are powered, the tires will consume battery when moving/travelling), an area ratio of lawn area vs other areas, a distance from the lawn to the grass disposal site (if the lawn mower collects grass in the grass bag).

In the above described embodiments of the disclosure, the work area information WAI was used to calculate the required electricity amount. However, the disclosure is not limited thereto. In another embodiment of the disclosure, the required electricity amount may be calculated by taking into consideration of other factors, for example, such as a mowing information, a lawn mower information and/or a grass information.

In an embodiment of the disclosure, predetermined coefficients may be assigned to each piece of the information included in the lawn shape information, the mowing information, the lawn mower information and the grass information. For example, if the lawn shape is rated at a complexity of 5, then the required electricity amount may be multiplied by, for example, a coefficient of 1.2 such that if the originally calculated required electricity amount was 5 ampere hours, the new required electricity amount may be 6 ampere hours (5 ampere hours×1.2=6.0 Ah).

In another example, if the lawn shape is rated at a complexity of 1, then the required electricity amount may be multiplied by, for example, a coefficient of 0.8 such that if the originally calculated required electricity amount was 5 ampere hours, the new required electricity amount may be 4 ampere hours (5 ampere hours×0.8=4.0 Ah).

In this way, predetermined coefficients may be assigned to each piece of the information included in the lawn shape information, the mowing information, the lawn mower information and the grass information, wherein the required electricity amount is calculated based on the predetermined coefficients.

The above coefficients and model equations are described as examples only and are not intended to limit the disclosure.

In an embodiment of the disclosure, the step of calculating the required electricity amount of the electric lawn mower is based on the work area information and a mowing information.

In another embodiment of the disclosure, the step of calculating the required electricity amount of the electric lawn mower is based on the work area information and a lawn mower information.

In another embodiment of the disclosure, the step of calculating the required electricity amount of the electric lawn mower is based on the work area information and a grass information.

In another embodiment of the disclosure, the step of calculating the required electricity amount of the electric lawn mower is based on the work area information, a mowing information and a lawn mower information.

In another embodiment of the disclosure, the step of calculating the required electricity amount of the electric lawn mower is based on the work area information, a mowing information and a grass information.

In another embodiment of the disclosure, the step of calculating the required electricity amount of the electric lawn mower is based on the work area information, a lawn mower information and a grass information.

In another embodiment of the disclosure, the step of calculating the required electricity amount of the electric lawn mower is based on the work area information, a mowing information, a lawn mower information and a grass information.

The mowing information may include information describing the mowing mode (for example, mulching mode, discharging mode), an estimated over lap width of adjacent passes of the lawn mower (may be measured or estimated by an actual lawn mower pass), a lawn mowing frequency (load is large when large amount of grass is cut at once), mowing height (target height of grass to be cut to).

The lawn mower information may include information describing, for example, a blade width, a blade length, a blade usage period (old blades become dull in which load increases), a travelling performance of the lawn mower (for example, tire size and/or fuel/battery economy), a size/rating of the electric motor disposed on the lawn mower.

The grass information may include information describing, for example, a type of the grass, a density of the grass. The type of grass that is inputted may be, for example, a "Meadow" having characteristics such as flowers shamrock and weed, a "Utility Lawn" having characteristics such as (medium dense) less weed but not perfect lawn, a "Sports" having characteristics of roll grass (high dense) perfect lawn.

In an embodiment of the disclosure, the system 1000 may be disposed on the lawn mower 10. In this case, when the required electricity amount is calculated by the system 1000, a user may select a battery, among a plurality of batteries of various specification, based on the required electricity amount that is calculated. After the battery is selected, the selected battery may be mounted to the lawn mower 10, and a user may perform a step of conducting grass cutting by the electric lawn mower using the selected battery. In this way, grass cutting may be efficiently performed when the lawn mower 10 is used to mow various different work areas WA.

In a case when the system 1000 is disposed on the lawn mower 10, the processor of the computer 1020 of the system 1000 may be the processor coupled to the ECU 700, or the processor of the computer 1020 of the system 1000 may be a processor different from the processor coupled to the ECU 700.

Figure 6:
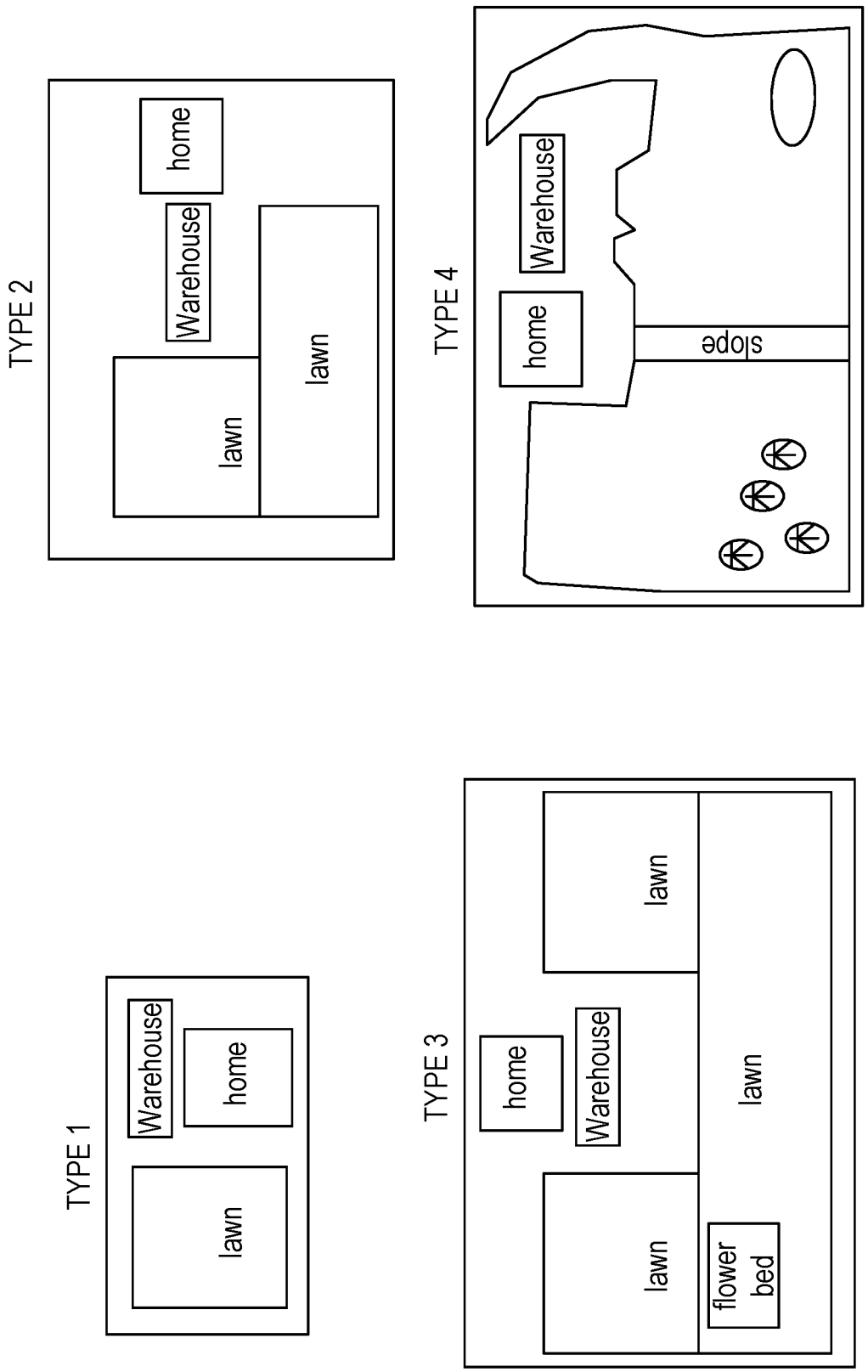
FIG. 6 illustrates examples of entering a lawn shape and a grass type according to an embodiment of the disclosure.

FIG. 4 illustrates an example of shape information and load factor information which may be inputted using an input unit according to an embodiment of the disclosure. FIG. 5 illustrates examples of inputting work area information, mowing information, and grass information according to an embodiment of the disclosure. FIG. 6 illustrates examples of entering a lawn shape and a grass type according to an embodiment of the disclosure, in which four types are illustrated. FIG. 7 illustrates an example showing results of a required electricity amount according to an embodiment of the disclosure.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of grass cutting by an electric lawn mower, wherein the electric lawn mower is powered by a battery, the method comprising:
   a step of inputting a work area information of the electric lawn mower into an input unit;
   a step of calculating a required electricity amount of the electric lawn mower based on the work area information;
   a step of outputting the required electricity amount to an output unit;
   a step of selecting the battery among a plurality of batteries based on the required electricity amount that is calculated;
   a step of conducting grass cutting by the electric lawn mower using the selected battery,
   wherein the step of calculating the required electricity amount of the electric lawn mower is based on the work area information, a mowing information, a lawn mower information and a grass information,
   wherein
   the work area information includes an area size of a work area of the electric lawn mower,
   the mowing information includes an overlap width when grass cutting by the electric lawn mower,
   the lawn mower information includes a blade width and blade length of a cutting blade,
   the grass information includes a grass type.

2. The method of grass cutting by the electric lawn mower according to claim 1, wherein the step of calculating the required electricity amount of the electric lawn mower is based on the work area information and a mowing information.

3. The method of grass cutting by the electric lawn mower according to claim 1, wherein the step of calculating the required electricity amount of the electric lawn mower is based on the work area information and a lawn mower information.

4. The method of grass cutting by the electric lawn mower according to claim 1, wherein the step of calculating the required electricity amount of the electric lawn mower is based on the work area information and a grass information.

5. The method of grass cutting by the electric lawn mower according to claim 1, wherein the step of calculating the required electricity amount of the electric lawn mower is based on the work area information, a mowing information and a lawn mower information.

6. The method of grass cutting by the electric lawn mower according to claim 1, wherein the step of calculating the required electricity amount of the electric lawn mower is based on the work area information, a mowing information and a grass information.

7. The method of grass cutting by the electric lawn mower according to claim 1, wherein the step of calculating the required electricity amount of the electric lawn mower is based on the work area information, a lawn mower information and a grass information.

8. A system comprising:
   a processor configured to:
      obtain, by an input unit, a work area information of an electric lawn mower;
      calculate, by a processor, a required electricity amount of the electric lawn mower based on the work area information; and
      output, by an output unit, the required electricity amount of the electric lawn mower,
      output, by the output unit, information regarding a recommended battery among a plurality of batteries based on the required electricity amount,
   an electric lawn mower using the recommended battery to conduct grass cutting,
   wherein the step of calculating the required electricity amount of the electric lawn mower is based on the work area information, a mowing information, a lawn mower information and a grass information,
   wherein
   the work area information includes an area size of a work area of the electric lawn mower,
   the mowing information includes an overlap width when grass cutting by the electric lawn mower,
   the lawn mower information includes a blade width and blade length of a cutting blade,
   the grass information includes a grass type.

9. The system according to claim 8, wherein the required electricity amount of the electric lawn mower is calculated based on the work area information and a mowing information.

* * * * *